US009594358B2

(12) United States Patent
White et al.

(10) Patent No.: US 9,594,358 B2
(45) Date of Patent: Mar. 14, 2017

(54) FEEDBACK CONTROLLER PARAMETER GENERATION WITH STABILITY MONITORING

(75) Inventors: Andrew D. White, Minneapolis, MN (US); Troy D. Nickel, Minneapolis, MN (US); David J. Deviley, Apple Valley, MN (US)

(73) Assignee: TA Instruments-Waters L.L.C., Milford, MA (US)

( * ) Notice: Subject to any disclaimer, the term of this patent is extended or adjusted under 35 U.S.C. 154(b) by 1950 days.

(21) Appl. No.: 12/770,868

(22) Filed: Apr. 30, 2010

(65) Prior Publication Data

US 2010/0280787 A1 Nov. 4, 2010

Related U.S. Application Data

(60) Provisional application No. 61/174,756, filed on May 1, 2009.

(51) Int. Cl.
*G01M 1/00* (2006.01)
*G05B 13/02* (2006.01)
(52) U.S. Cl.
CPC ................. *G05B 13/025* (2013.01)
(58) Field of Classification Search
CPC .................................................. G05B 13/025
USPC .............................................. 702/124
See application file for complete search history.

(56) References Cited

U.S. PATENT DOCUMENTS

| 3,648,031 | A | * | 3/1972 | Neal | G05D 3/1445 318/616 |
| 4,006,351 | A | * | 2/1977 | Constant | G01S 7/292 708/314 |
| 5,511,431 | A | * | 4/1996 | Hinton | G01M 5/005 73/805 |
| 5,517,426 | A | | 5/1996 | Underwood | |
| 5,623,402 | A | | 4/1997 | Johnson | |
| 6,405,599 | B1 | | 6/2002 | Patt | |
| 2003/0033058 | A1 | | 2/2003 | Lund | |
| 2004/0257093 | A1 | * | 12/2004 | Sakiyama | G01R 27/02 324/650 |

FOREIGN PATENT DOCUMENTS

| EP | 0124136 A2 | 11/1984 |
| WO | 2008023226 A2 | 2/2008 |

OTHER PUBLICATIONS

Soderling et al., "Servo Controller Compensation Methods Selection of the Correct Techniqu for Test Application," Society of Automotive Engineers (1999).*

(Continued)

*Primary Examiner* — Hyun Park
(74) *Attorney, Agent, or Firm* — McCarter & English, LLP; Deborah M. Vernon; Heath T. Misley

(57) ABSTRACT

Stability of a control system for a materials testing system using specified filter parameters is confirmed by inputting to the control system a test signal having a predetermined waveform, automatically monitoring the output of the materials testing system, and automatically comparing the output to a threshold. If the output exceeds the threshold, a first action is taken. If the output does not exceed the threshold, input of a command signal to the control system is permitted.

10 Claims, 7 Drawing Sheets

(56) References Cited

OTHER PUBLICATIONS

Steve Soderling, Malcolm Sharp, Shcristoph Leser: "Servo Controller Compensation Methods—Selection of the Correct Technique for Test Applications" 1999, pp. 1-13, XP00260811 Retrieved from the Internet: URL:http://www.cannon-leser.net/master/Crhistoph/SAE1999-01-3000.pdf [retireved on Sep. 13, 2010] abstract pp. 5,6,8-13.
Plummer A R: "control techniques for structural testing: a review" Proceedings of the Institution of Mechanical Engineers. Journal of Engineering in Medicine. Part H, Mechnical Engineering Publications Ltd, London, GB LNKD-DOI: 10.1243/09596518JSCE295, vol. 221, No. 2, Jan. 1, 2007 (Jan. 1, 2007), pp. 139-169, XP009138580 ISSN: 0954-4119 pp. 139-141 pp. 148-154.
International Search Report and Written Opinion for PCT/US2010/033164 dated Oct. 1, 2010, 18 pages.
Notification of First Office Action dated Apr. 2, 2013 for European Application No. 10731621.8-1802.
First CN Office Action dated Apr. 3, 2013for CN Patent Application No. 201080018605.3.
Second Chinese Office Action dated Dec. 24, 2013 for Chinese Patent Application No. 201080018605.3.

\* cited by examiner

FEEDBACK CONTROLLER PARAMETER GENERATION WITH STABILITY MONITORING

CLAIM TO PRIORITY

This application claims priority to U.S. Provisional application 61/174,756, filed May 1, 2009, the entire contents of which are incorporated here by reference.

BACKGROUND

This disclosure relates to generally to electro-magnetic material test systems. In particular, the present invention relates to feedback controller parameter generation and initial controller stability monitoring.

SUMMARY

In general, in some aspects, stability of a control system for a materials testing system using specified filter parameters is confirmed by inputting to the control system a test signal having a predetermined waveform, automatically monitoring the output of the materials testing system, and automatically comparing the output to a threshold. If the output exceeds the threshold, a first action is taken. If the output does not exceed the threshold, input of a command signal to the control system is permitted.

Implementations may include one or more of the following features. The test signal includes two square waves centered at the mean position of the command signal. The square waves have a frequency of 1 Hz. The test signal includes an attenuated version of the command signal. The test signal includes a low-frequency version of the command signal. The test signal includes a waveform matching a waveform of the command signal and having an amplitude of 95 percent of the command signal's amplitude. The threshold varies with the test signal. The threshold is a percentage of the test signal amplitude. The test signal includes a combination of a low-frequency and slightly attenuated version of the command signal and a small-amplitude, high-frequency signal. Taking the first action includes stopping operation of the control system. Taking the first action includes determining a transfer function of the materials testing system, computing parameters for filters of the control system, loading the computed parameters in the filters, and repeating the stability test. Computing the parameters includes convolving the transfer function with the filters to produce the parameters.

In general, in some aspects, filter parameters for a control system are determined by generating a random noise signal, applying a low-pass filter to the random noise signal to produce a first filtered signal, applying a high-pass filter to the first filtered signal to produce a second filtered signal, superimposing the second filtered signal on a sinusoidal waveform to produce a reference test waveform, applying the reference test waveform to a system under test, measuring the output of the system under test, determining a transfer function of the system under test, and convolving the transfer function with the filters to produce the filter parameters.

Advantages include confirming the stability of a system before fully implementing a controller, preventing possible damage to the system or the sample.

Other features and advantages will be apparent from the description and the claims.

DESCRIPTION

FIGS. 3A, 3B, and 5A, and 5B show flowcharts.

Figure 4:
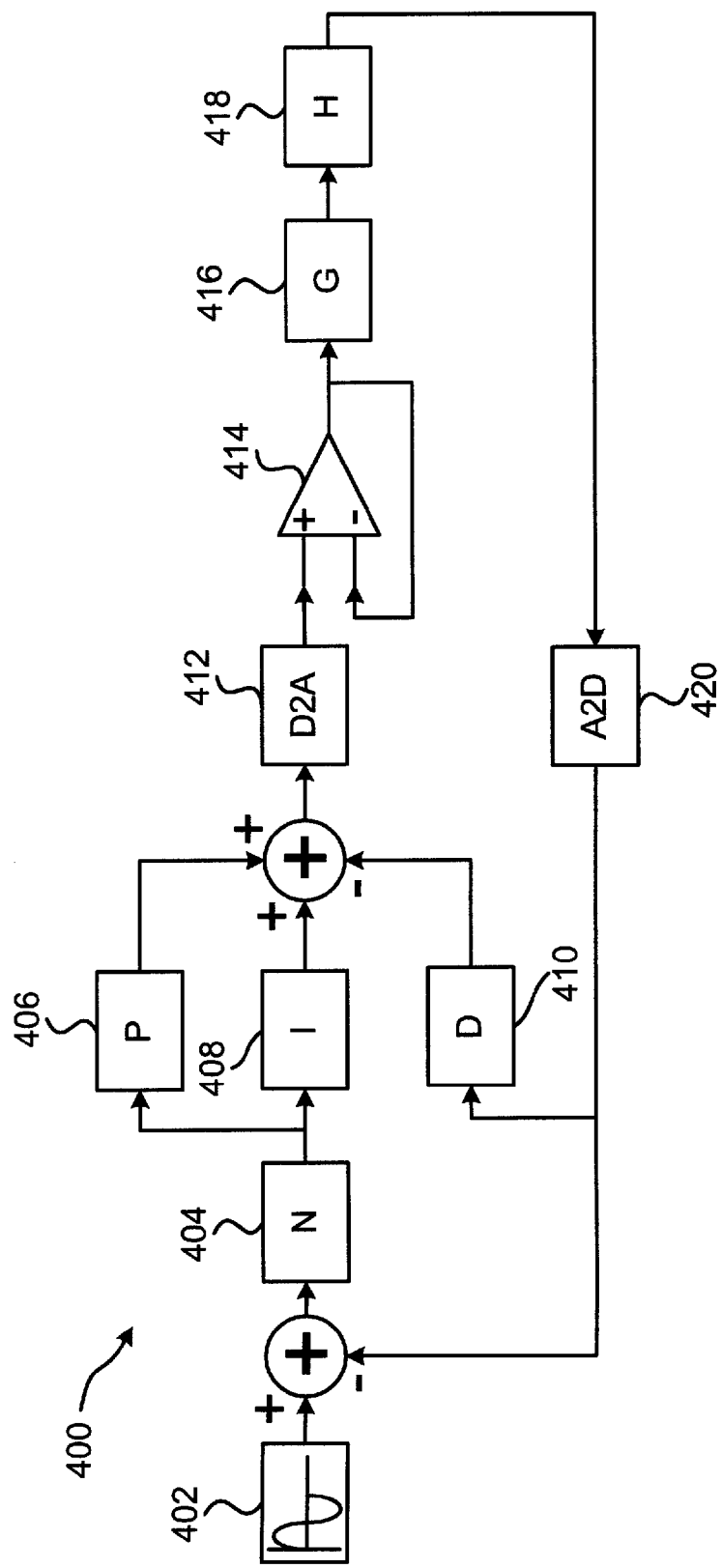

FIG. 4 shows a block diagram of a controller for an electro-magnetic material test system.

Electro-magnetic motors can be used for material and device testing. These tests include both static and dynamic tests. Examples of such devices include the ElectroForce® 3000 series of test instruments from the ElectroForce Systems Group of Bose Corporation, located in Eden Prairie, Minn., and are described in U.S. Pat. No. 6,405,599, issued Jun. 18, 2002, and incorporated here by reference.

Figure 1:
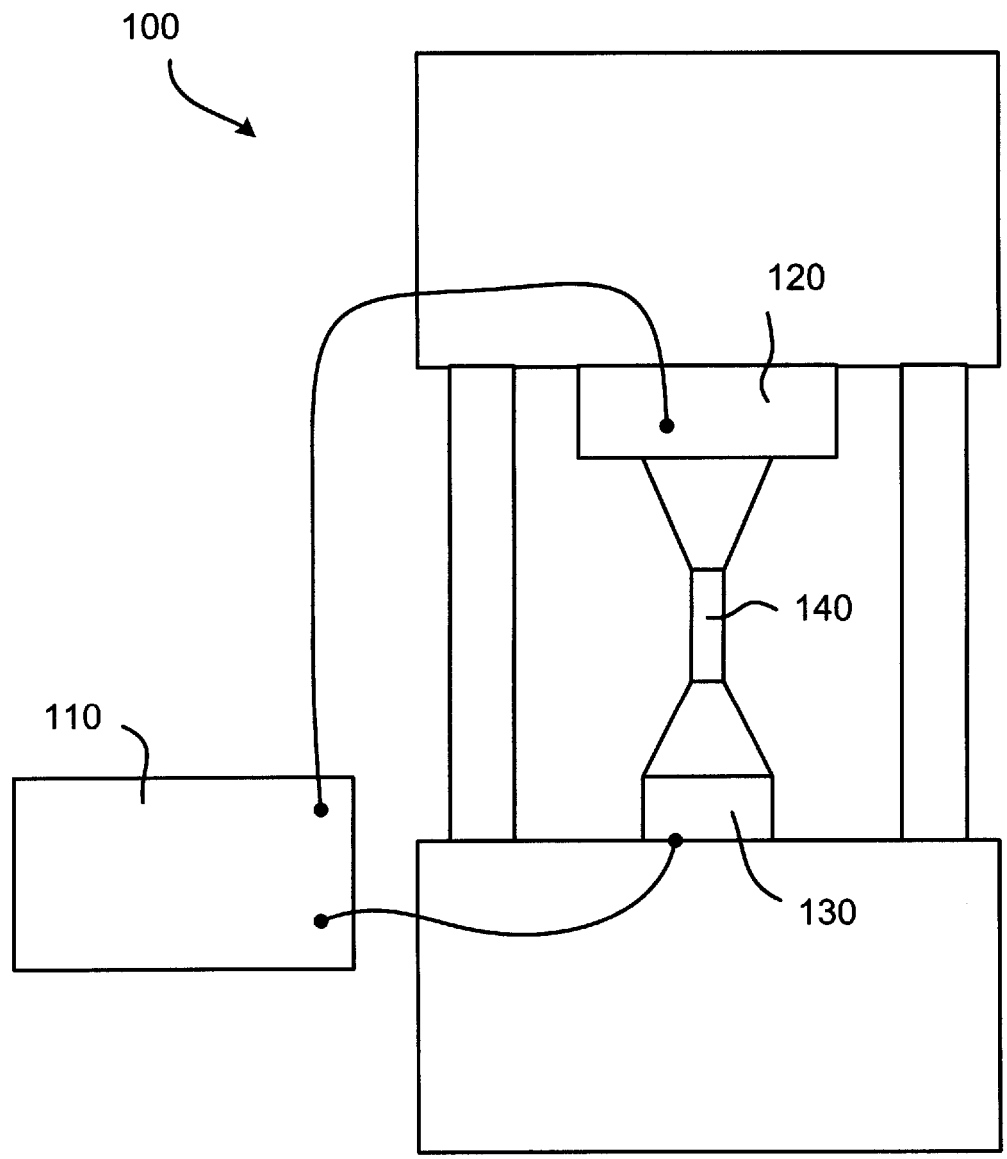
FIG. 1 shows a block diagram of an electro-magnetic material testing system.

Materials testing systems typically utilize a feedback controller to modify the system dynamics such that the output can follow a desired input. Potential input signals include displacement, load, strain, and others. An example system 100 is shown schematically in FIG. 1, with a feedback controller 110 coupled to a motor assembly 120 and a load cell 130, with a device under test 140 positioned between the motor assembly 120 and load cell 130.

In electro-magnetic based test systems, unlike many hydraulic-based or leadscrew-based test systems, the characteristics of the sample under test significantly affect the test system dynamics. In order to ensure that the feedback controller is stable and provides adequate dynamic response, parameters of the feedback loop compensator need to be adjusted based on the characteristics of the sample under test.

In many examples the feedback compensator is based on PID (proportional, integral, derivative) type compensation, in which three parallel filters each influence the control signal. In the general case, the input to these three filters is the error signal that is generated by subtracting a feedback signal, based on a measurement of the output, from the desired input signal. For electro-magnetic test systems it is often beneficial to use the feedback signal itself as the input to the derivative filter as this can be used to increase the damping of the system. Other types of control may also be used, such as time-domain control based on a state-space model of the system, linear controllers, lead-lag controllers, or fuzzy logic controllers.

Figure 2:
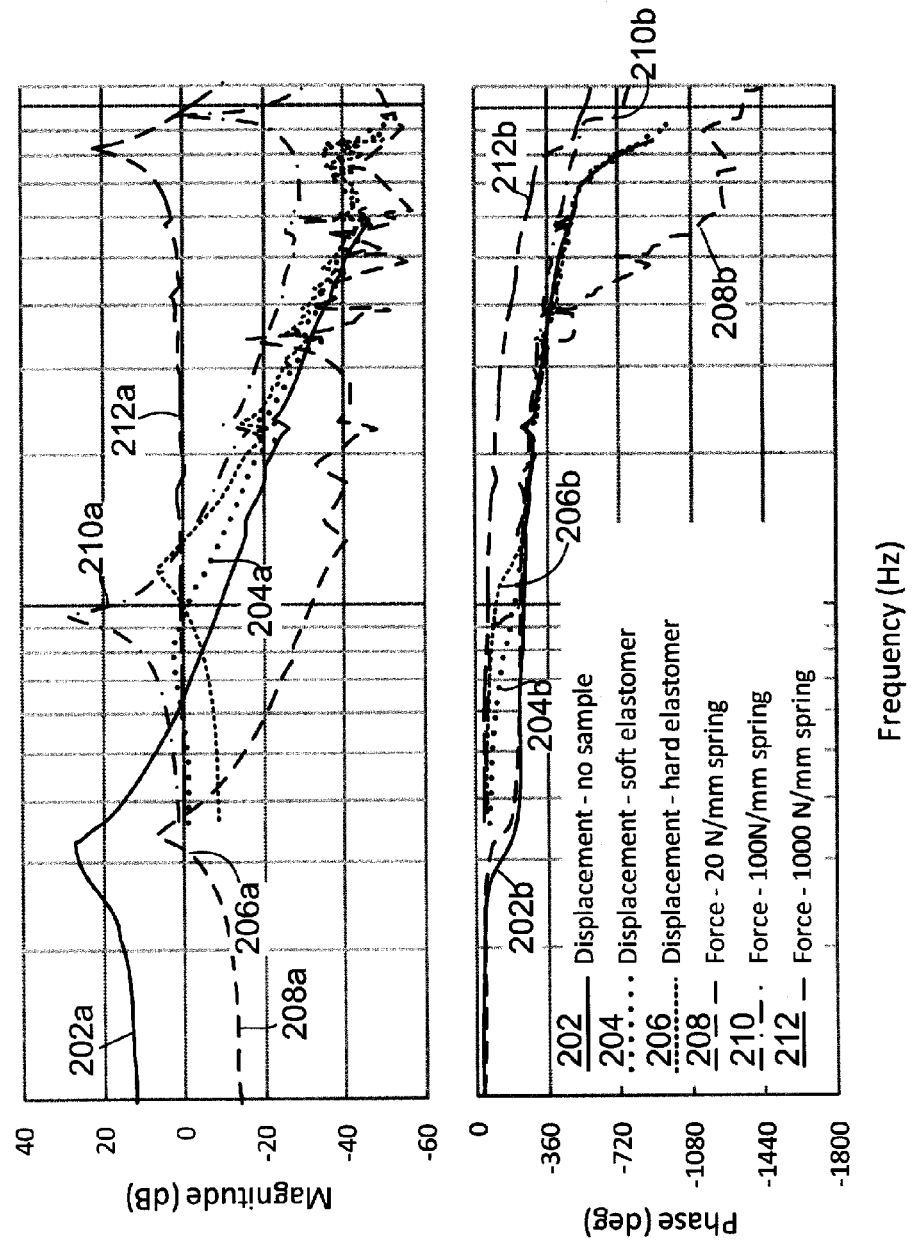
FIG. 2 shows graphs of the system dynamics for various samples tested in an electro-magnetic material testing system.

In some electro-magnetic test systems, the sample significantly affects the dynamics of the system, as shown in FIG. 2. Lines 202a/b, 204a/b, and 206a/b show the magnitude and phase of a displacement measurement for three different samples and lines 208a/b, 210a/b, and 212a/b show the magnitude (a) and phase (b) of a force measurement for three different springs. When the system dynamics are so affected by the sample, the parameters of the controller, such as the gains of the proportional, integral and derivative filters in a PID controller, must be modified for each sample under test.

Figure 3A:
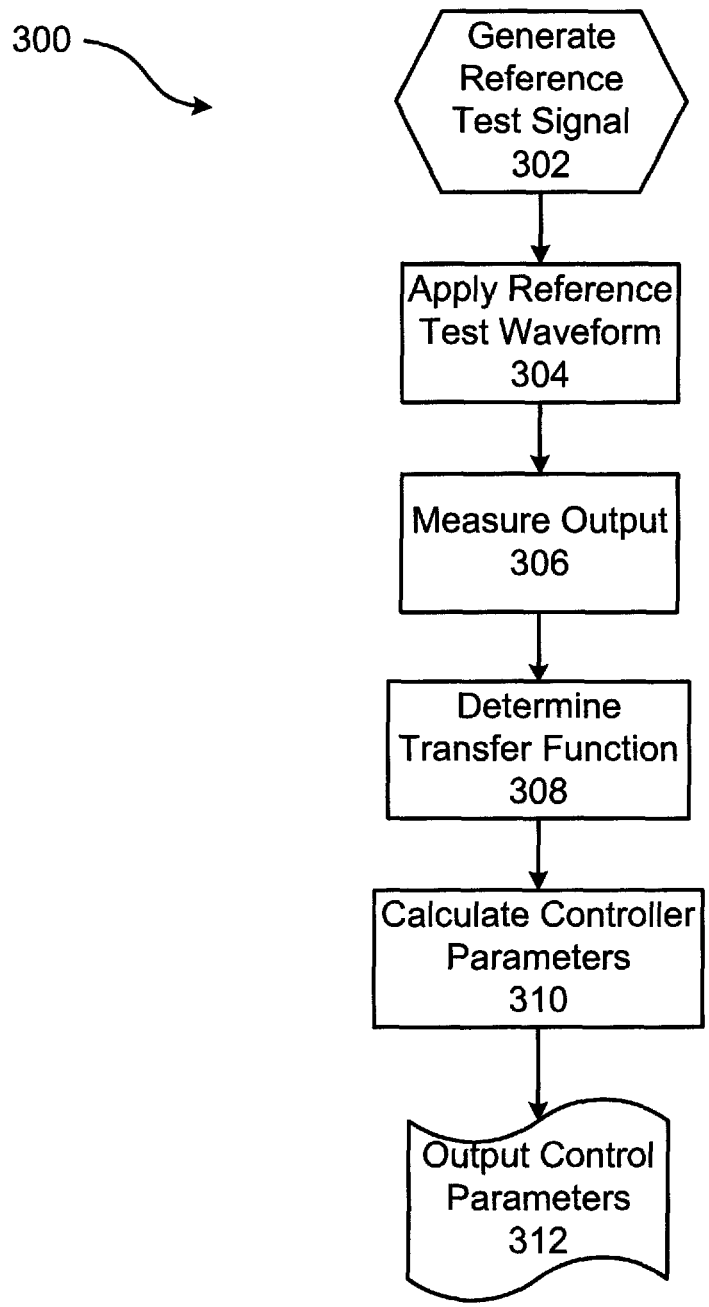

In some examples, the process of determining parameters to use in the feedback loop compensator is automated. In order to automate determining the parameters, the system dynamics of the combination of the test machine and the sample under test must be identified. This can be accomplished using system identification techniques that are well-known. The output of the system identification is a frequency-domain representation of the system. It is desirable that the representation has adequate resolution to identify all of the dynamics within the frequency bandwidth of the control system. FIG. 3A shows a generalized representation of the process 300 for determining the feedback parameters. A reference test signal is generated (302), as described below, and applied (304) to the test system. Feedback (output) signals for a material test system may include displacement, force, strain, acceleration, pressure, and others. The output is measured (306) and the time history data of the reference and the output signals are processed using Fourier methods to determine (308) a transfer function of the system. Feedback controller parameters, discussed below, are calculated (310) by convolving the controller's filters with the measured transfer function. The control parameters are then stored or output (312) for use in testing.

Due to the significant variations in system dynamics potentially caused by the sample under test, the reference signal is typically voltage or current and the system identification is performed with the controller operating in an open-loop configuration. The reference signal should be designed to contain frequency content consistent with the frequency and bandwidth of the signal to be used as input during the testing. This reference signal can be designed using random, chirp, impulse, or swept sine signals or combinations of signals.

Figure 3B:
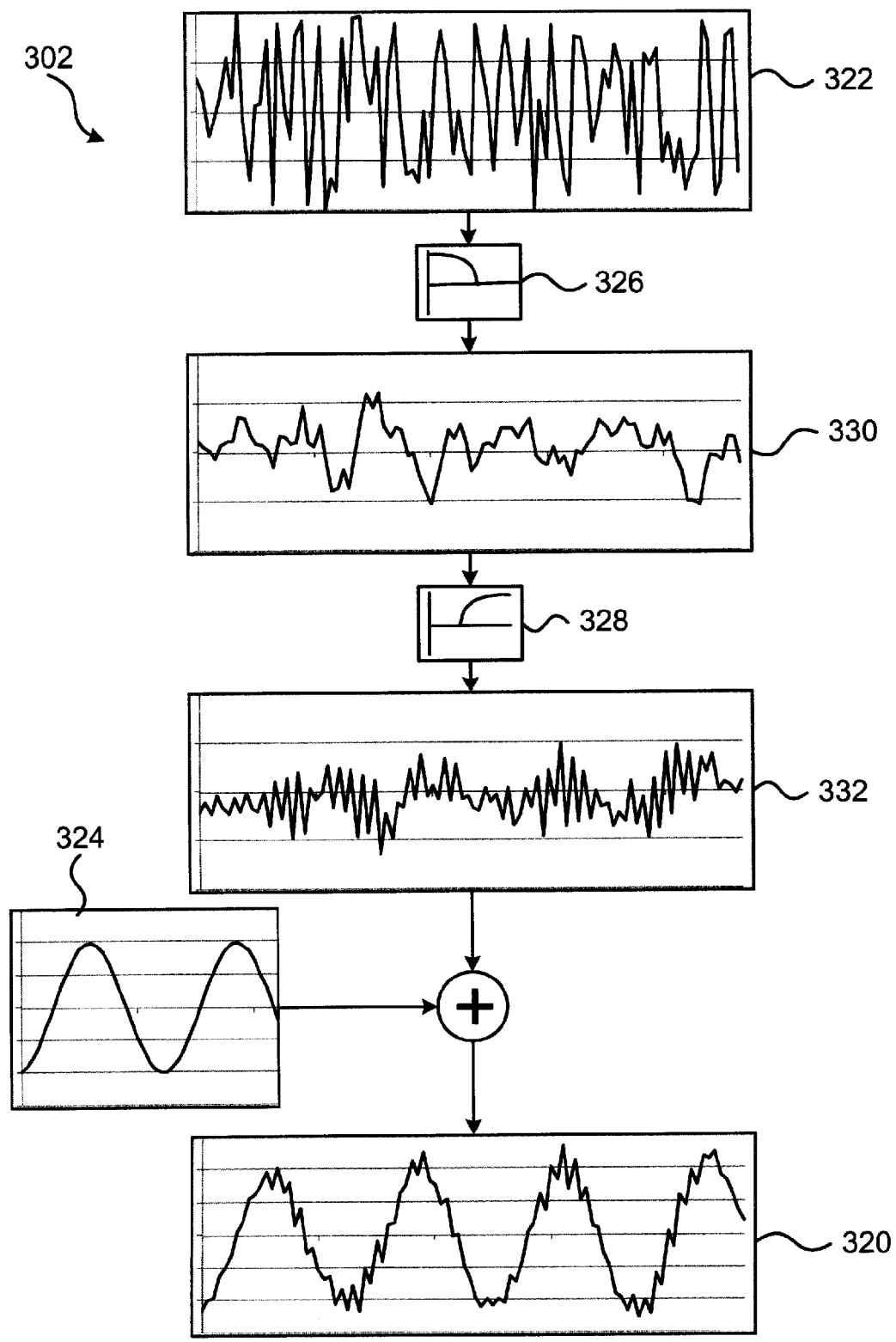

In some examples, the reference test signal 320 is a filtered random noise signal 322 superimposed on a small-amplitude low-frequency carrier wave 324, such as a 2 Hz sine wave, and is generated (302) as shown in FIG. 3B. The filter parameters used for the random component may be based on the properties of the motor being controlled by the signal. In some examples, each of several motor types has a unique high-pass filter and a low-pass filter used to shape the random waveform. The high pass corner frequency may be chosen to be at a frequency greater than the free-air resonance of the system. In the example of FIG. 3, the noise signal 322 is passed through a low-pass filter 326 and a high-pass filter 328 before being superimposed on the carrier wave 324, producing intermediate waveforms 330 and 332. The combined amplitude of the test signal 320 is designed to be less than the intended command waveform amplitude. In some examples, the amplitude of the test signal is limited to less than 10 percent of the motor or sensor capacities. Such settings are motor-specific and customized to a particular set of test equipment. The filtered random noise test signal 320 covers the full bandwidth of frequencies seen in the test, providing a good basis for determining the system transfer function.

An example feedback controller 400 is shown in FIG. 4. The input command signal 402 is summed with a negative feedback signal and then passed through a notch filter 404. The notch filter is used to minimize the gain of resonances that cannot be minimized using the derivative inner loop, and is characterized by a filter parameter N. The test signal is provided to a proportional control block 406 and integral control block 408. The differential control block 410 takes the feedback signal as its input directly. The P, I, and D control outputs are summed (with D inverted) to form the updated test control signal, which is converted to an analog control signal in digital-to-analog converter (D2A) 412. The analog control signal is amplified in a transconductance amplifier 414 with current feedback before being provided to the test equipment 416. The combined test mechanism and sample system is represented by a single transfer function G. A sensor 418 having transfer function H provides the feedback signal to an analog-to-digital converter (A2D) 420. The individual blocks represented in FIG. 4 are for example only, and each may be implemented in a number of ways, including in hardware and software, and as discrete components/steps or integrated in various combinations. For example, the sensor 418 may have a digital output, eliminating the need for A2D converter 420.

The feedback controller parameters N, P, I, and D are calculated by convolving the controller's filters with the measured transfer function. Determination of the gain values for the controller's parameters involves balancing various specifications. These specifications may include gain and phase margins, time domain specifications, power specifications, bandwidth, disturbance rejection specifications and others. The specifications are used, among other things, to protect the sample and the test equipment from being damaged by inappropriate input values, such as values that exceed the capabilities of the system or that would cause destructive manipulation of the device under test (assuming that is not the goal of the test).

It is possible for errors to occur during the system identification and parameter determination processes. Errors may occur due to, for example, non-linearities in the sample, friction in the sample or test system, or sensor noise, to name a few. Such errors can cause incorrect estimates of transfer function gain and phase which can then result in calculation of incorrect controller parameters. With incorrect parameters, the system may become unstable when the controller is operated in a closed-loop configuration. If the system is allowed to operate with an unstable controller configuration, the sample is likely to be damaged, and elements of the machine may also be damaged.

As shown in FIG. 5, an automated system implements a stability check before the system is allowed to implement the calculated parameters and perform normal testing. In the stability check process 500, the calculated parameters are loaded (502), and the system is allowed to start operation. However, constraints are placed (504) on the feedback channel. These may include constraining the maximum and minimum value for the feedback channel, for example. Thresholds are set such that machine operation is discontinued if any of these thresholds are exceeded. Prior to applying the command waveform as input to the controller, a stability test waveform is applied (506) and the resulting operation is monitored (508) automatically. If none of the thresholds are exceeded, the system is deemed stable and normal testing is allowed (512). If thresholds are exceeded, then normal testing is prevented (514). One method of stopping the test system if a threshold has been exceeded is to immediately switch into the open loop mode at the mean value of the test waveform. A further improvement to this method is to also switch into a controller mode that uses the derivative filter. This will minimize the oscillations that may occur with unstable controllers.

Figure 5A:
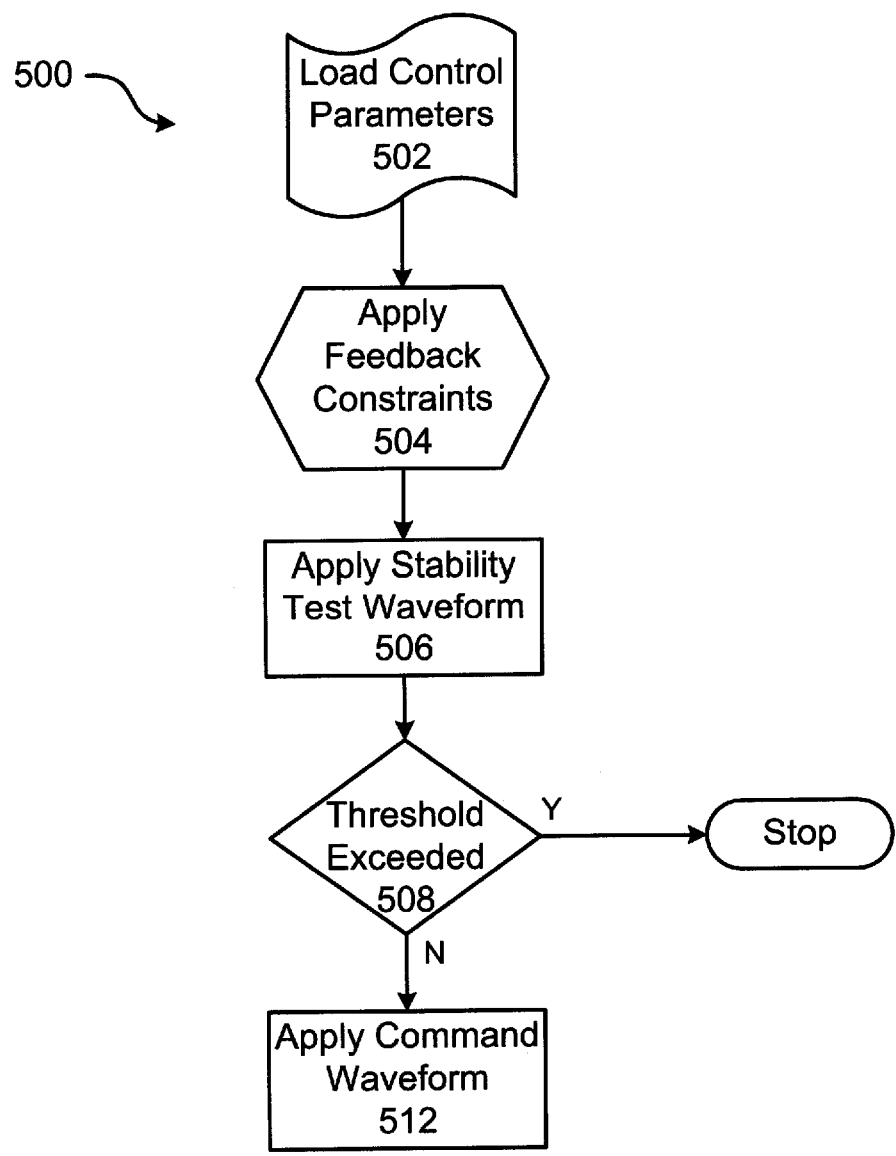
Figure 5B:
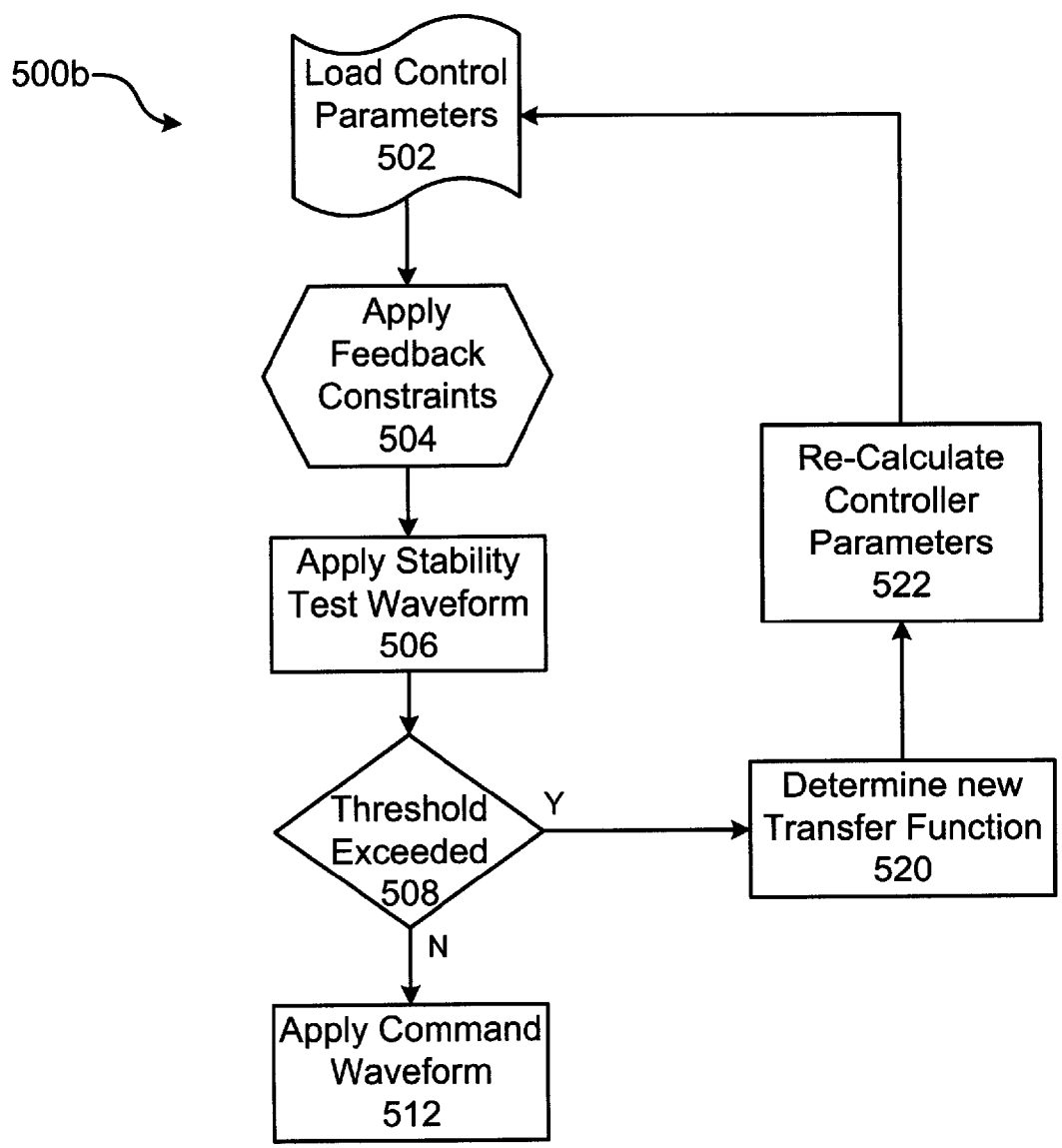

In some examples the system dynamics are re-evaluated based on the stability test waveform if the system fails the threshold test. As shown in FIG. 5B, when the threshold is exceeded (508) in modified process 500b, the system transfer function is re-evaluated and a new transfer function is determined (520), and new controller parameters are calculated (522). The new controller parameters may be determined by convolving the new transfer function with the filters as before. These new controller parameters are provided to the stability test process and the test is repeated. Once the system converges on a stable set of parameters, the response will be within the threshold and the command waveform can be applied (512).

In some examples, the stability test waveform takes the form of two square waves at 1 Hz, centered at the desired command waveform's mean position. The square waves are of small amplitude, typically 5 percent of the desired command waveform's amplitude. For small command waveforms, the stability test waveform amplitude will be a greater percentage, but still less in absolute value than the command waveform amplitude.

In some examples, the stability test waveform takes the form of an attenuated or low-frequency version of the desired command waveform, and the error thresholds may vary with the test signal. For example, a slow (e.g., 0.5 Hz) triangle or sin wave with a peak magnitude of 95 percent of the requested amplitude may be used as the test input, and the error threshold tracks to +/−5 percent of each desired waveform point throughout the wave. Such a slow test waveform can help confirm that the test system, including the sample, has a linear response, as is often assumed. The attenuated value of the test waveform, as compared to the control input waveform, may be set based on the nature of the sample, e.g., a weaker material being tested may use only 80 percent of the desired command signal, while a sample known to be robust may use a full-strength test signal matching the amplitude of the desired command signal.

In some examples, the test system outputs to the user the reason the test was halted. That is, it may output which threshold was exceeded, and if known, what control parameter or what aspect of the input signal led to the system exceeding that threshold.

In some examples, the stability test waveform is a combination of the large-amplitude, low-frequency waveform described above with a smaller and higher-frequency signal, such as a square, chirp, or noise waveform. Superposing the higher-frequency signal on the lower-frequency carrier waveform may yield confirmation of full-band stability over potentially non-linear sample characteristics.

Other implementations are within the scope of the following claims and other claims to which the applicant may be entitled.

What is claimed is:

1. A method of confirming stability of a control system for a materials testing system using specified filter parameters, the method comprising:
    inputting to the control system a test signal having a predetermined waveform;
    automatically monitoring an output of the materials testing system;
    automatically comparing the output to a threshold;
    if the output exceeds the threshold, taking a first action to avoid unintended damage to one or more of a sample to be tested and the materials testing system; and
    if the output does not exceed the threshold, taking a second action in the form of permitting input to the control system of a command signal.

2. The method of claim 1 wherein the test signal comprises two square waves.

3. The method of claim 2 wherein the square waves have a frequency of 1 Hz.

4. The method of claim 1 wherein the test signal comprises an amplitude attenuated version of the command signal.

5. The method of claim 1 wherein the test signal comprises a waveform matching a waveform of the command signal and having an amplitude of 95 percent of an amplitude of the command signal.

6. The method of claim 1 wherein the threshold varies with the test signal.

7. The method of claim 1 wherein taking the first action comprises stopping operation of the control system.

8. The method of claim 1 wherein taking the first action comprises:
    determining a transfer function of the materials testing system, the method of claim 1 further including:
    computing parameters for filters of the control system;
    loading the computed parameters in the filters; and
    repeating the steps of claim 1.

9. The method of claim 8 wherein computing the parameters comprises convolving the transfer function with the filters to produce the parameters.

10. A method of determining filter parameters for a control system, the method comprising:
    generating a random noise signal;
    applying a low-pass filter to the random noise signal to produce a first filtered signal;
    applying a high-pass filter to the first filtered signal to produce a second filtered signal;
    superimposing the second filtered signal on a sinusoidal waveform to produce a reference test waveform;
    applying the reference test waveform to a system under test;
    measuring an output of the system under test;
    determining a transfer function of the system under test; and
    convolving the transfer function with the low-pass and high-pass filters to produce the filter parameters, whereby use of the filter parameters in the control system avoids unintended damage to one or more of a sample to be tested and the system under test.

* * * * *